(12) United States Patent
Guels

(10) Patent No.: US 6,502,609 B1
(45) Date of Patent: Jan. 7, 2003

(54) CUTTER HEAD TOGETHER WITH KNIFE AND KNIFE HOLDER THEREFOR

(75) Inventor: Martin Guels, Murrhardt (DE)

(73) Assignee: Lindex Chipping Systems, Inc., Vancouver, WA (US)

( * ) Notice: Subject to any disclaimer, the term of this patent is extended or adjusted under 35 U.S.C. 154(b) by 0 days.

(21) Appl. No.: 09/455,792

(22) Filed: Dec. 7, 1999

(30) Foreign Application Priority Data

Dec. 18, 1998 (DE) .......................................... 198 58 740

(51) Int. Cl.$^7$ .............................. B27C 1/00; B27C 5/00
(52) U.S. Cl. .................. 144/176; 144/162.1; 144/241; 407/40; 407/42; 407/48
(58) Field of Search ............................... 144/162.1, 172, 144/174, 176, 218, 241; 407/40, 42, 47, 48, 49, 102–104

(56) References Cited

U.S. PATENT DOCUMENTS

| | | | |
|---|---|---|---|
| 3,875,984 A | 4/1975 | Plough | 144/162 R |
| 4,231,406 A | * 11/1980 | Jonsson | 407/48 |
| 4,396,315 A | 8/1983 | Middleton | 407/41 |
| 4,669,516 A | 6/1987 | Carpenter et al. | 144/241 |
| 4,681,485 A | * 7/1987 | Koelewijn | 407/42 |
| 4,997,018 A | 3/1991 | Carpenter et al. | 144/241 |
| 5,044,570 A | 9/1991 | Montgomery Sr. | 241/294 |
| 5,146,963 A | 9/1992 | Carpenter et al. | |
| 5,271,440 A | 12/1993 | Bradstreet, Jr. et al. | |
| 5,271,442 A | 12/1993 | Carpenter et al. | |
| 5,333,659 A | 8/1994 | Carpenter et al. | |
| 5,348,065 A | 9/1994 | Meyer | |
| 5,511,597 A | 4/1996 | Shantie et al. | |
| 5,653,274 A | * 8/1997 | Johnson et al. | 407/42 |
| 5,660,218 A | 8/1997 | Jonkka | |
| 5,896,902 A | * 4/1999 | Maybon | 144/241 |
| 5,904,193 A | * 5/1999 | Kellner | 144/241 |
| 5,951,214 A | * 9/1999 | Rothballer et al. | 407/42 |
| 5,893,401 A | * 11/1999 | Eriksson | 144/241 |
| 5,997,018 A | 12/1999 | Carpenter et al. | |
| 6,053,671 A | * 4/2000 | Stedt et al. | 407/47 |

FOREIGN PATENT DOCUMENTS

| | | |
|---|---|---|
| DE | 2456034 A1 | 6/1975 |
| DE | 3314127 A1 | 10/1983 |
| DE | 44 05 783 | 9/1994 |
| DE | 195 13 699 C1 | 4/1996 |

* cited by examiner

*Primary Examiner*—W. Donald Bray
(74) *Attorney, Agent, or Firm*—Crowell & Moring LLP

(57) ABSTRACT

A cutter head, especially a chipping cutter head for chip forming timber machinery, is disclosed together with a knife and knife holder therefor. The cutter head, with a basic cutter head body, has at least one knife mounting area with holder contact surfaces inclined in a V-shape. At least one knife is detachably fixed to the respective knife mounting area by a fixing screw with the knife bearing with knife contact surfaces inclined in a V-shape against the holder contact surfaces. The fixing screw retains the knife on the knife mounting area by means of a retaining force acting in the area between the contact surfaces inclined in a V-shape.

30 Claims, 1 Drawing Sheet

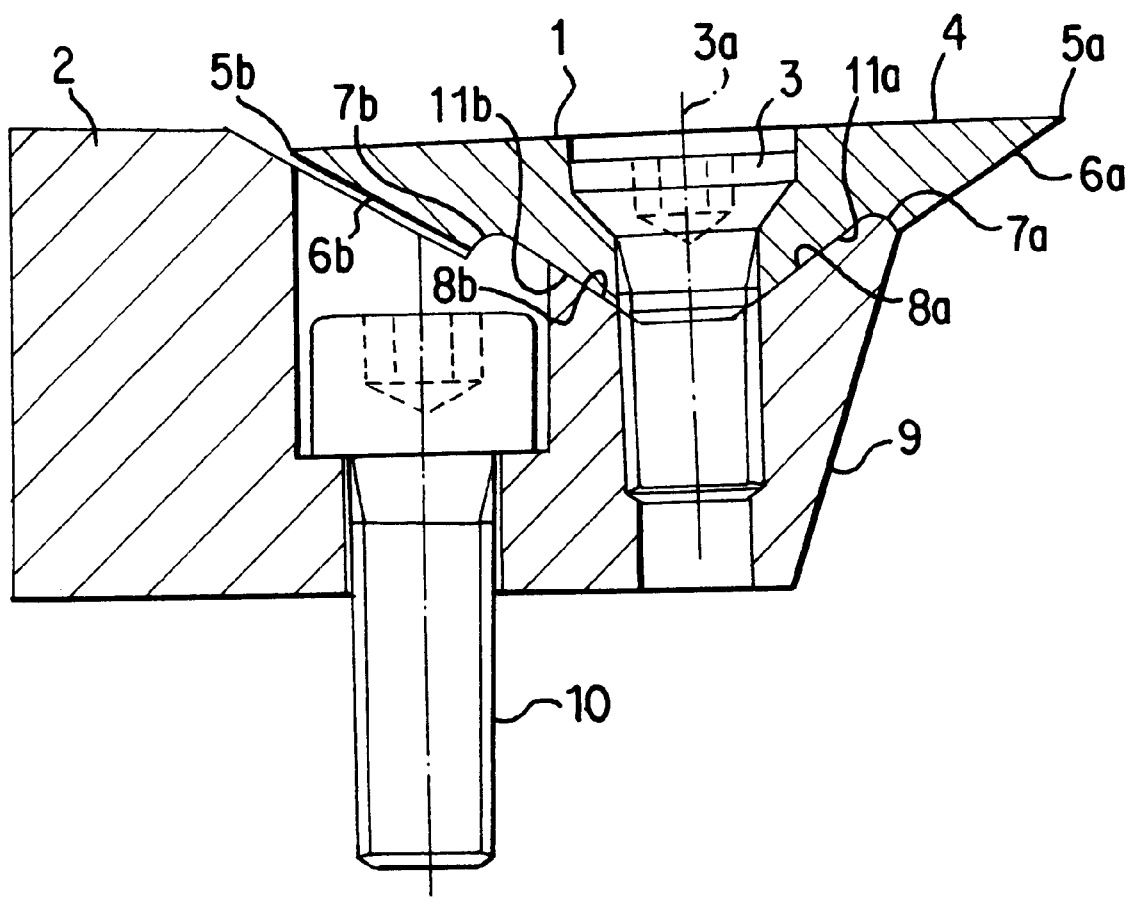

CUTTER HEAD TOGETHER WITH KNIFE AND KNIFE HOLDER THEREFOR

BACKGROUND AND SUMMARY OF THE INVENTION

This application claims the priority of German application number 198 58 740.6, filed Dec. 18, 1998, the disclosure of which is expressly incorporated by reference herein.

The invention relates to a cutter head and to a knife and a knife holder, which can be used for such a cutter head. Preferred embodiments of the invention relate to chipper cutter heads for chip forming timber machining.

Cutter heads of this type fitted with one or more suitable knives are used, for example, for the removal, in the form of chips, of lateral segments of logs in profile chipping cutters and choppers for the manufacture of paper wood chips. On a rotating cutter head, peripheral knives are generally used as chipping knives and end knives as flat facing knives to form a corresponding chipping cutter system. Precise positioning of the knives is very important, especially in the case of flat facing cutters, which produce the final surface on boards and beams. To this end, conventional knives are often pre-adjusted in an appropriate adjusting device by means of adjusting screws fitted to the knife. Indexing the knives by appropriate shaping so that they can be fixed only in a certain position to the knife mounting area of the cutter head is known as an alternative. However, play due to the design thereof may lead to inaccuracies and hence to an unsatisfactory surface of the boards or beams. In addition to the knives with just one cutting edge that were once exclusively used, so-called reversible knives have been used increasingly in recent years, which are provided with a cutting edge on each of the opposite sides and which, once one cutting edge has become worn, can be fixed in a position turned through 180° in order to use the other cutting edge on the cutter head. The knives are conventionally clamped against the knife mounting area and in this way retained there by means of clamping elements, which are screwed into the cutter head. Instead of rotary cutter heads that rotate in operation, fixed cutter heads fitted with knives can now also be used, to which the workpiece to be machined is advanced by rotational or other movement.

A cutter head of the said type for a profile chipping cutter with chipping knives and a circular saw annular element as smooth finishing tool is disclosed in German printed patent specification DE 195 13 699 C1.

In a cutter head of the generic type, as is disclosed in U.S. Pat. No. 5,271,440, reversible knives with plane knife contact surface and toothed profiling of the opposing knife front face are proposed. The knives are clamped against the knife mounting area of the cutter head by means of a clamping element, which is screwed on to the cutter head or a knife holder element thereof, and with a contact surface, which is provided with a corresponding, toothed surface profiling, are pressed against the toothed front surface.

In a type of cutter head, as is described in U.S. Pat. Nos. 4,997,018; 5,146,963; 5,271,442; 5,333,659; and 5,511,597, knives are used which in the central area of their contact side have a flat recess of rectangular cross-section. In this way the edge of the recess outwardly terminates essentially perpendicular to an adjoining free tool face of the knife. A corresponding key, formed on the knife mounting area, engages in the recess. A clamping element screwed on the cutter head or a knife holder element thereof presses against the knife front face remote from the holder, thereby clamping the knife to the knife mounting area.

In a further cutter head of the generic type, disclosed in the U.S. Pat. No. 5,348,065, knives are proposed which in cross-section comprise two edge areas with a parallel and angular offset and an intervening central area inclined in relation thereto. The central area abuts each edge area respectively at a V-shaped angle of more than 135°. As a result the knife, on each of the two opposing main surfaces, has two pairs of opposing, abutting V-shaped bearing surfaces, which interact with correspondingly V-shaped counter-bearing surfaces on the knife mounting area or on a clamping element, so that the knife is pressed by the clamping element and thereby clamped against the knife mounting area, interlocking therewith.

Common to all the above-mentioned, conventional cutter heads is the fact that the knife is held by a clamping element, which is fixed to the cutter head by one or more screw connections located at the side of the knife. Consequently only one side of the clamping element presses on the knife, so that the line of application of the clamping compressive force that the clamping element exerts on the knife runs laterally side by side with the line of application of the screw fixing of the clamping element.

In addition to a cutter head of the generic type in accordance with U.S. Pat. No. 5,348,065 cited above, the published German patent application DE 33 14 127 A1 also discloses a cutter head not of the generic type, in which the upper part of a filler element of a basic cutter head body forms a knife holder, on which an elevation of rectangular cross-section is formed, which engages in a corresponding rectangular recess in the knife. The knife and a closing plate arranged thereafter in the direction of rotation are each fixed to the knife holder from the top side by means of screws.

In a chopping device described in the German published patent application DE 24 56 034 A1 a knife of non-generic type is used, in which the knife comprises an elongated plate element of V-shaped cross-section, which terminates at an end face in the form of a V-shaped tip forming the knife cutting edge. A plurality of the said V-shaped knives with end face cutting edge are inserted into a corresponding stepped profile of support plates on the cutter head side. A clamping collet or a clamping head with corresponding V-shaped bearing surface is mounted on each knife and fixed to the basic cutter head body by means of a screw, the said collet being inserted through an opening in the knife formed as a slot for knife adjusting purposes.

The invention addresses the technical problem of providing a cutter head of the said type and knife and knife holder suitable therefor in such a way that the knife/knives can be held, self-centring and relatively free of play, on the knife mounting area, and can be changed relatively easily without costly adjustment operations.

The invention solves this problem by providing a cutter head assembly comprising a basic cutter head body with at least one knife mounting area having holder contact surfaces inclined in a V-shaped cross-section, and at least one knife detachably fixed to the respective knife mounting area by an assigned fixing structure, said at least one knife having a knife cutting edge on at least one of two opposite sides of the V-shaped cross section, said at least one knife having knife contact surfaces correspondingly inclined in a V-shaped cross-section and bearing against the holder contact surfaces inclined in a V-shape, wherein the fixing structure retains the knife at the knife mounting area with a retaining force acting between the contact surfaces inclined in a V-shape and hence between the two opposite sides of the knife.

In certain preferred embodiments of the invention, the corresponding bearing and contact surfaces between knife and knife mounting area are formed on the one hand by contact surfaces on the knife mounting area having a V-shaped incline in relation to one another, and on the other by contact surfaces on the knife having a correspondingly V-shaped incline in relation to one another, and the means of fixing for locating the knife on the knife mounting area retains the knife, which is provided with one, or in the case of the reversible knife, two opposing cutting edges running perpendicular to the cross-sectional plane, by means of a retaining force which characteristically acts on the knife in the area between the bearing surfaces inclined in a V-shape. The line of application of the said retaining force therefore lies in the angular range spanned by the bearing surfaces inclined in a V-shape, so that when locating the knife on the knife mounting area, the action of the retaining force results in self-centering of the knife. The centered knife position is at the same time clearly defined by the pair of interacting contact surfaces, inclined in a V-shape and lying opposite one another in relation to the line of application of the retaining force. The retaining force acting between the said pairs of interacting contact surfaces inclined in a V-shape, also results in a uniform distribution of forces over the contact surfaces and thereby all in all in a favorable, uniform action of the fixing force on the knife and the knife mounting area. These characteristic features of the knife mounting therefore ensure secure gripping of the knife free of play at the cutter head, even under load in chipping operations, and facilitate rapid mounting of the knife with high repeat accuracy of the knife position when inserting a new knife and with no costly adjustment operations.

In certain preferred embodiments of the invention, the means of fixing comprise a direct means of fixing without clamping elements, that is a means of fixing which connects the knife directly to the knife mounting area and which is formed, for example, by one or more screw connections. Since the direct means of fixing act on the knife itself and not on a clamping element clamping it, there is in this case no need for such a clamping element.

In a cutter head developed according to certain preferred embodiments of the invention, the contact surfaces terminate outwardly with the formation of a corresponding shoulder essentially perpendicular to an adjoining free tool face of the knife. This is very reliable in preventing the penetration of chips and dust particles between knife and knife holder.

In a cutter head developed according to certain preferred embodiments of the invention, the contact surfaces inclined in a V-shape enclose an angle of less than 130° and owing to this comparatively steep V-angle produce a correspondingly reliable self-centring function.

In a cutter head developed according to certain preferred embodiments of the invention, the V-angle selected for the contact surfaces on the knife side is slightly flatter than for the corresponding contact surfaces of the knife mounting area. This has the effect that when fitting the knife its contact surfaces initially bear against the knife mounting area primarily on the outer end areas of the V-flanks and are then pressed, self-centring under the action of the means of fixing, into the V-shaped receiver formed by the contact surfaces of the knife mounting area. In the process the material of the knife and/or of the knife mounting area elastically yields very slightly to a corresponding extent. The angular difference between the Vshaped contact surfaces of the knife on the one hand and the knife mounting area on the other is selected so that the mounted knife, by way of the interacting V-shaped contact surfaces, bears against the knife mounting area with a contact pressure which is still sufficiently high at the end flanks of the V-contact surfaces to ensure a secure, gap-free bearing contact there and thereby to prevent any penetration of dust particles.

In a cutter head developed according to certain preferred embodiments of the invention, the two contact surfaces on the knife having a V-shaped incline towards one another and hence also those on the knife mounting area are inclined at the same angle to the line of application of the retaining force, by which the means of fixing retain knife at the knife mounting area. This symmetrical configuration of the contact surfaces in relation to the retaining force is conducive to a uniform distribution of forces and thereby to a secure grip of the knife at the knife mounting area and the self-centring function of the contact surfaces.

In a knife according to certain preferred embodiments of the invention, it is provided that, on that contact face to be applied against the knife mounting area of a cutter head, with knife contact surfaces having a V-shaped incline, such that the knife is suitable for fitting to the cutter head of the type referred to above.

In a knife holder according to certain preferred embodiments of the invention, the knife holder forms a separate component as a knife mounting area for receiving a knife and can be detachably fitted to the basic body of a cutter head of the type referred to above.

Other objects, advantages and novel features of the present invention will become apparent from the following detailed description of the invention when considered in conjunction with the accompanying drawings.

BRIEF DESCRIPTION OF THE DRAWING

The single FIGURE shows a longitudinal section through a knife-knife holder arrangement of a cutter head that rotates in operation, constructed in accordance with a preferred embodiment of the present invention.

DETAILED DESCRIPTION OF THE DRAWING

The single drawing FIGURE represents a knife-knife holder arrangement that forms part of a chipping cutter system of a rotary cutter head fitted with knives, a plurality of such knife-knife holder arrangements preferably being provided, distributed over the end face and/or periphery in a manner known in the art, on the cutter head that rotates in operation. The knife-knife holder arrangement contains a knife 1 of reversible knife type, which is fitted to a knife holder 2, designed as a separate component, which in turn can be fitted to a basic cutter head body of conventional design (not shown) by means of one or more screw connections 10, thereby forming the knife mounting area of the cutter head for receiving the respective knife 1. Depending on the type of reversible knife, the knife 1 has a knife cutting edge 5a, 5b on each of the opposing narrow side edges, the said cutting edges being formed by the lateral areas of a plane flank 4, remote from the knife holder, and tool faces 6a, 6b of the knife 1 running at an incline towards each of the former.

The central area of that side of the knife facing the knife holder, between the tool faces 6a, 6b, forms the contact surface area with which the knife 1 comes to bear against the knife mounting area of the cutter head in the form of the knife holder 2 and which characteristically comprises two knife contact surfaces 11a, 11b, having a V-shaped incline towards one another. In the example shown the knife contact surfaces 11a, 11b are inclined towards one another at an angle of approximately 110°, other angles of inclination smaller than 180°, preferably less than 130°, also being alternatively possible. Corresponding to this, the knife holder 2, in its knife contact area, has two holder contact surfaces 8a, 8b correspondingly inclined towards one another in a V-shape, which form a trough or V-shaped receiver, in which the knife 1 is received, self-centring by means of its two contact surfaces 11a, 11b. In this case the angle enclosed by the holder contact surfaces 8a, 8b having a Vshaped incline towards one another is made slightly larger than that of the knife contact surfaces 11a, 11b, typically one or a few degrees larger, for example 112° for an angle of 110° between the knife contact surfaces 11a, 11b.

One or more screw connections, by means of which the knife 1 is detachably fixed directly and therefore without the aid of a separate clamping element by screwing to the knife holder 2, are provided as direct means of fixing symmetrically in the central area between the two knife contact surfaces 11a, 11b, having a V-shaped incline towards one another, and between the two holder contact areas 8a, 8b inclined in a V-shape. The longitudinal axis 3a of each screw connection 3, which at the same time represents the line of application of this direct knife fixing, forms the angle bisector between the two knife contact surfaces 11a, 11b and between the two holder contact surfaces 8a, 8b, that is to say the two pairs of interacting knife contact surfaces/holder contact surfaces lie symmetrically opposite one another in relation to the line of application of the retaining force 3a of each screw connection 3.

In their end areas remote from the knife fixing screw(s) 3 and facing the respective tool faces 6a, 6b, the knife contact surfaces 11a, 11b and the holder contact surfaces 8a, 8b are provided with a curvature, forming a respective shoulder 7a, 7b, in such a way that they adjoin the said curvature perpendicular to the adjacent tool faces 6a, 6b. This effectively prevents chips and dust particles penetrating between the knife 1 and the knife holder 2 in the operation of the cutter head, in which the chips formed by the exposed, radially outer, cutting edge, shown on the right in the FIGURE, flow off via the associated tool face 6a and are broken up by an adjoining chip breaker face 9 on the knife holder 2.

The V-shaped design of the interacting contact surfaces 8a, 8b, 11a, 11b of the knife 1 on the one hand and the knife holder 2 on the other has a discernible self-centring function when mounting the knife, so that once the currently active outer cutting edge 5a has become worn the knife 1 can be rapidly and easily turned or replaced with a high positioning repeat accuracy, without the need for costly adjustment operations. The knife 1 with its contact surfaces 11a, 11b inclined in a V-shape merely needs to be inserted without precise adjustment into the receiver formed by the holder contact surfaces 8a, 8b. When subsequently fixing the knife 1 to the knife holder 2 by screwing in one or more screws 3, the knife 1 then automatically centres itself and thereby readily assumes its desired, exact position, in locating which the shoulders 7a, 7b also serve as an aid. The self-centring characteristic also derives partially from the fact that the two pairs of interacting contact surfaces 8a, 11a and 8b, 11b having a V-shaped incline towards one another are in each case inclined at an acute angle to the line of application 3a of the retaining force, so that the retaining force exerted on the knife 1 by the fixing screw 3 results in a centring force component directed towards the line of application 3a of the retaining force and parallel to the contact surfaces 8a, 8b, 11a, 11b on both interacting pairs of contact surfaces 8a, 11a and 8b, 11b respectively. The symmetrical position of the opposing pairs of contact surfaces 8a, 11a and 8b, 11b in relation to the line of application 3a of the knife screw connection 3 is moreover conducive to a uniform distribution of the retaining forces exerted by the knife screw connection 3.

Making the selected V-angle of the holder contact forces 8a, 8b somewhat greater than that of the knife contact surfaces 11a, 11b, as described above, achieves the desired effect that, when mounting the knife 1 it initially bears with its contact surfaces 8a, 8b against the holder contact surfaces 8a, 8b primarily in their outer area facing the corresponding shoulder 7a, 7b. On screwing in the fixing screw 3, thereby increasingly generating the retaining force, the knife contact surfaces 11a, 11b also bear increasingly with their inner area adjacent to the screw connection 3 against the corresponding inner areas of the holder contact surfaces 8a, 8b, the material of the knife 1 and/or the knife holder 2 yielding elastically to a correspondingly slight extent.

In the finally mounted condition shown, the knife contact surfaces 11a, 11b then no longer bear just essentially in a line but are really with a contact pressure distributed fairly uniformly over the entire extent of their surfaces against the holder contact surfaces 8a, 8b. The knife 1, bearing evenly, is therefore fixed free of play to the knife holder 2. In any event the said difference in the V-angle between the knife contact surfaces 11a, 11b and the holder contact surfaces 8a, 8b is preferably to be selected so that even with the knife 1 finally mounted the interacting contact surfaces 8a, 11a and 8b, 11b respectively still bear against one another with sufficiently great contact pressure and are therefore reliably gap-free in their outer end area forming the respective shoulder 7a, 7b, in order to counter any penetration of chips and dust particles. Whether, in the inner area adjacent to the knife screw(s) 3, the pairs of contact surfaces 8a, 11a and 8b, 11b bear against one another with just as high a contact pressure or with a lower one, is of less importance.

The cutter head equipped with one or more of the knife-knife holder units shown can be used in particular for a chipping cutter system for the machining of round and sawn timbers and for the planing, milling or chopping of timber and other machinable materials. It goes without saying that in addition to the embodiment shown further realisations of the invention are possible. Thus, instead of the reversible knife shown, a knife with only one lateral cutting edge may be used. In addition, the knife holder need not be a component separately fixed to the cutter head, rather a corresponding knife mounting area may, where necessary, be formed directly on the basic cutter head body. It furthermore goes without saying that, instead of the screw connections shown, any other equivalent means of fixing known to the person skilled in the art may be used. As a further alternative, instead of the screw connection fixing the knife directly to the knife holder, a clamping element fixing may be provided, which comprises a clamping element to be detachably fixed to the knife holder, the said clamping element pressing against the flank of the knife remote from the holder in such a way that it exerts a clamping force, pressing the knife against the knife holder and acting in the area between the knife contact surfaces and holder contact surfaces inclined in a V-shape. Obviously, according to the invention a fixed cutter head fitted with knives can also be used, to which the knife/knives are fixed in the manner described above for the example of a rotating cutter head and to which the workpiece to be machined is advanced by rotational or other movement.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A chipping cutter head assembly comprising:
   a cutter head body with at least one knife mounting area having two holder contact surfaces inclined in a V-shaped cross-section, and
   at least one knife detachably fixed to the respective knife mounting area by a fixing structure, said at least one knife having a knife cutting edge extending along and parallel at least one of two opposite sides of the V-shaped cross-section, said at least one knife having two knife contact surfaces correspondingly inclined in a V-shaped cross-section and bearing against the respective holder contact surfaces inclined in a V-shape,
   wherein the fixing structure retains the knife at the knife mounting area with a retaining force acting between the two contact surfaces inclined in a V-shape and hence between the two opposite sides of the knife.

2. Cutter head according to claim 1, wherein the fixing structure comprises a connection of the knife to the knife mounting area without intervening clamping elements.

3. Cutter head according to claim 1, wherein the knife support contact surfaces and holder contact surfaces terminate outwardly in an area adjacent to a knife tool face forming a cutting edge, with the formation of a shoulder extending essentially perpendicular to the adjoining knife tool face.

4. Cutter head according to claim 1, wherein the knife support contact surfaces and the holder contact surfaces are inclined in a V-shape which in each case encloses an angle of less than 130°.

5. Cutter head according to claim 4, wherein the knife support contact surfaces inclined in a V-shape are inclined at a somewhat smaller angle of inclination than the holder contact surfaces.

6. Cutter head according to claim 1, wherein the knife support contact surfaces at respective opposite sides of the fixing structure are inclined by approximately the same angle in relation to the line of application of the retaining force of the fixing structure.

7. Cutter head according to claim 2, wherein the knife support contact surfaces and the holder contact surfaces are inclined in a V-shape which in each case encloses an angle of less than 130°.

8. Cutter head according to claim 3, wherein the knife support contact surfaces and the holder contact surfaces are inclined in a V-shape which in each case encloses an angle of less than 130°.

9. Cutter head according to claim 7, wherein the knife support contact surfaces inclined in a V-shape are inclined at a somewhat smaller angle of inclination than the holder contact surfaces.

10. Cutter head according to claim 8, wherein the knife support contact surfaces inclined in a V-shape are inclined at a somewhat smaller angle of inclination than the holder contact surfaces.

11. Knife for a chipping cutter head which exhibits a knife mounting area having two holder contact surfaces inclined in a V-shaped cross-section, said knife comprising two knife support contact surfaces inclined towards one another in a V-shape and at angle of less than 130°, said knife having a knife cutting edge which in use extends along and parallel to a side of the V-shaped cross-section, said knife support contact surfaces forming bearing surfaces for attaching the knife to the cutter head.

12. Knife for a chipping cutter head according to claim 11, wherein the knife support contact surfaces and the holder contact surfaces are inclined in a V-shape which in each case encloses an angle of less than 130°.

13. Knife for a chipping cutter head according to claim 12, wherein the knife support contact surfaces inclined in a V-shape are inclined at a somewhat smaller angle of inclination than the holder contact surfaces.

14. Knife for a chipping cutter head according to claim 11, wherein the knife support contact surfaces at respective opposite sides of the fixing structure are inclined by approximately the same angle in relation to the line of application of the retaining force of the fixing structure.

15. Knife for a chipping cutter head according to claim 13, wherein the knife support contact surfaces at respective opposite sides of the fixing structure are inclined by approximately the same angle in relation to the line of application of the retaining force of the fixing structure.

16. Knife holder for a chipping cutter head having a basic cutter head body, said knife holder being configured to be detachably fixed to a basic cutter head body and forming a knife mounting area with two holder contact surfaces inclined towards one another by less than 130° which in use engage knife support contact surfaces of a knife held in the knife holder with the knife support contact surfaces inclinded in a V-shape inclined at a somewhat smaller angle of inclination than the holdcer contact surfaces.

17. Knife holder for a chipping cutter head according to claim 16, wherein the knife support contact surfaces and the holder contact surfaces are inclined in use in a V-shape which in each case encloses an angle of less than 130°.

18. Knife holder for a chipping cutter head according to claim 17, wherein the knife support contact surfaces inclined in a V-shape are inclined at a somewhat smaller angle of inclination than the holder contact surfaces.

19. Knife holder for a chipping cutter head according to claim 18, wherein the knife support contact surfaces at respective opposite sides of the fixing structure are inclined by approximately the same angle in relation to the line of application of the retaining force of the fixing structure.

20. A chipping cutter head assembly comprising:
   a knife mounting member including holder contact surfaces inclined to form a V-shaped cross-section,
   a knife including knife support contact surfaces inclined to form a V-shaped cross-section and engageable with the holder contact surfaces when the knife is attached to the knife mounting member, said knife including a through opening, and
   a fixing member extendible through the knife through opening and operable to detachably connect the knife to the knife mounting member with said contact surfaces engaging one another to center and hold the knife in position,
   wherein the contact surfaces are configured to provide different clamping forces at outer edges of the knife as compared to inner sections of the knife disposed adjacent the fixing member.

21. A chipper cutter head assembly according to claim 20, wherein the V-shaped cross-section of the holder contact surfaces and the knife support contact surfaces are configured to provide increased clamping engagement of the outer edges of the knife and knife mounting member as compared to a section of the knife disposed closer to the fixing member.

22. A chipper cutter head assembly according to claim 20, wherein respective holder contact surfaces at opposite sides of the fixing member are inclined at a holder angle of less that 130°.

23. A chipper cutter head assembly according to claim 21, wherein respective knife support contact surfaces at opposite sides of the fixing member are inclined at a knife angle of less than 130°.

24. A chipper cutter head assembly according to claim 22, wherein said holder angle and knife angle are at least 1° different from one another.

25. A chipper cutter head assembly according to claim 23, wherein the fixing member is a clamping screw which directly clampingly engages the knife in a recessed stepped first part of the knife through opening.

26. A chipper cutter head assembly according to claim 23, wherein the knife mounting member is a cutter head body.

27. A chipper cutter head assembly according to claim 23, wherein the knife member is a knife holder which is detachably connectible with a cutter head body.

28. A chipping cutter head assembly comprising:

a cutter head body with at least one knife mounting area having holder contact surfaces inclined in a V-shaped cross-section, and at least one knife detachably fixed to the respective knife mounting area by a fixing structure, said at least one knife having a knife cutting edge on at least one of two opposite sides of the V-shaped cross-section, said at least one knife having knife contact surfaces correspondingly inclined in a V-shaped cross-section and bearing against the holder contact surfaces inclined in a V-shape, wherein the fixing structure retains the knife at the knife mounting area with a retaining force acting between the contact surfaces inclined in a V-shape and hence between the two opposite sides of the knife, and wherein the knife support contact surfaces and holder contact surfaces terminate outwardly in an area adjacent to a knife tool face forming a cutting edge, with the formation of a shoulder extending essentially perpendicular to the adjoining knife tool face.

29. A chipping cutter head assembly comprising:

a cutter head body with at least one knife mounting area having holder contact surfaces inclined in a V-shaped cross-section, and at least one knife detachably fixed to the respective knife mounting area by a fixing structure, said at least one knife having a knife cutting edge on at least one of two opposite sides of the V-shaped cross-section, said at least one knife having knife contact surfaces correspondingly inclined in a V-shaped cross-section and bearing against the holder contact surfaces inclined in a V-shape, wherein the fixing structure retains the knife at the knife mounting area with a retaining force acting between the contact surfaces inclined in a V-shape and hence between the two opposite sides of the knife, wherein the knife support contact surfaces and the holder contact surfaces are inclined in a V-shape which in each case encloses an angle of less than 130°, and wherein the knife support contact surfaces inclined in a V-shape are inclined at a somewhat smaller angle of inclination than the holder contact surfaces.

30. Knife holder for a chipping cutter head having a basic cutter head body, said knife holder being configured to be detachably fixed to a basic cutter head body and forming a knife mounting area with holder contact surfaces inclined towards one another by less than 130°, wherein the knife support contact surfaces and the holder contact surfaces are inclined in a V-shape which in each case encloses an angle of less than 130°, and wherein the knife support contact surfaces inclined in a V-shape are inclined at a somewhat smaller angle of inclination than the holder contact surfaces.

* * * * *